United States Patent
Koch

(10) Patent No.: US 10,361,555 B2
(45) Date of Patent: Jul. 23, 2019

(54) DEVICE TO REDUCE RESIDUAL CURRENT

(71) Applicant: Eaton Industries (Austria) GmbH, Schrems (AT)

(72) Inventor: Michael Koch, Korneuburg (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 227 days.

(21) Appl. No.: 15/326,041

(22) PCT Filed: Jul. 16, 2015

(86) PCT No.: PCT/EP2015/066273
§ 371 (c)(1),
(2) Date: Jan. 13, 2017

(87) PCT Pub. No.: WO2016/008978
PCT Pub. Date: Jan. 21, 2016

(65) Prior Publication Data
US 2017/0214240 A1    Jul. 27, 2017

(30) Foreign Application Priority Data
Jul. 16, 2014  (DE) .......................... 10 2014 109 952

(51) Int. Cl.
*H02H 9/02* (2006.01)
*H02H 9/08* (2006.01)
(Continued)

(52) U.S. Cl.
CPC .............. *H02H 9/02* (2013.01); *H02H 9/025* (2013.01); *H02H 9/08* (2013.01); *G05F 1/573* (2013.01);
(Continued)

(58) Field of Classification Search
USPC .................................. 361/93.7–93.9, 42, 115
See application file for complete search history.

(56) References Cited

U.S. PATENT DOCUMENTS

2009/0296298 A1* 12/2009 Divan .................... H02H 3/025
361/58
2009/0323239 A1* 12/2009 Markyvech ........... B60L 3/0069
361/57
(Continued)

FOREIGN PATENT DOCUMENTS

AT          144304 B     1/1936
CN          1304198 A    7/2001
(Continued)

*Primary Examiner* — Danny Nguyen
(74) *Attorney, Agent, or Firm* — Leydig, Voit & Mayer, Ltd.

(57) ABSTRACT

A device for reducing residual current in an electrical circuit, in particular an electrical low-voltage line, has a residual current sensor and a current measuring unit, wherein an output of the residual current sensor is connected to an input of the current measuring unit. The device has a voltage reducing unit, the voltage reducing unit is connected to an output of the current measuring unit, and the voltage reducing unit is designed to reduce the electrical voltage—subsequently applied to the device—depending on the height of the measured residual current in order to limit the measured residual current to a predeterminable value, in particular 30 mA.

9 Claims, 1 Drawing Sheet

(51) Int. Cl.
*H02H 3/08* (2006.01)
*H01H 83/20* (2006.01)
*G05F 1/573* (2006.01)
*H01H 83/14* (2006.01)

(52) U.S. Cl.
CPC .......... *H01H 83/144* (2013.01); *H01H 83/20* (2013.01); *H02H 3/08* (2013.01)

(56) References Cited

U.S. PATENT DOCUMENTS

| | | | |
|---|---|---|---|
| 2012/0056718 A1* | 3/2012 | Leutgeb | G06K 19/0712 340/10.1 |
| 2012/0069484 A1 | 3/2012 | Dobusch | |
| 2013/0314828 A1 | 11/2013 | Chen et al. | |

FOREIGN PATENT DOCUMENTS

| | | | |
|---|---|---|---|
| CN | 101926069 A | 12/2010 | |
| CN | 102394491 A | 3/2012 | |
| CN | 102870186 A | 1/2013 | |
| CN | 103500984 A | 1/2014 | |
| DE | 102011055371 A1 | 5/2013 | |
| EP | 2091123 A2 | 8/2009 | |
| SU | 1473000 A1 | 4/1989 | |

\* cited by examiner

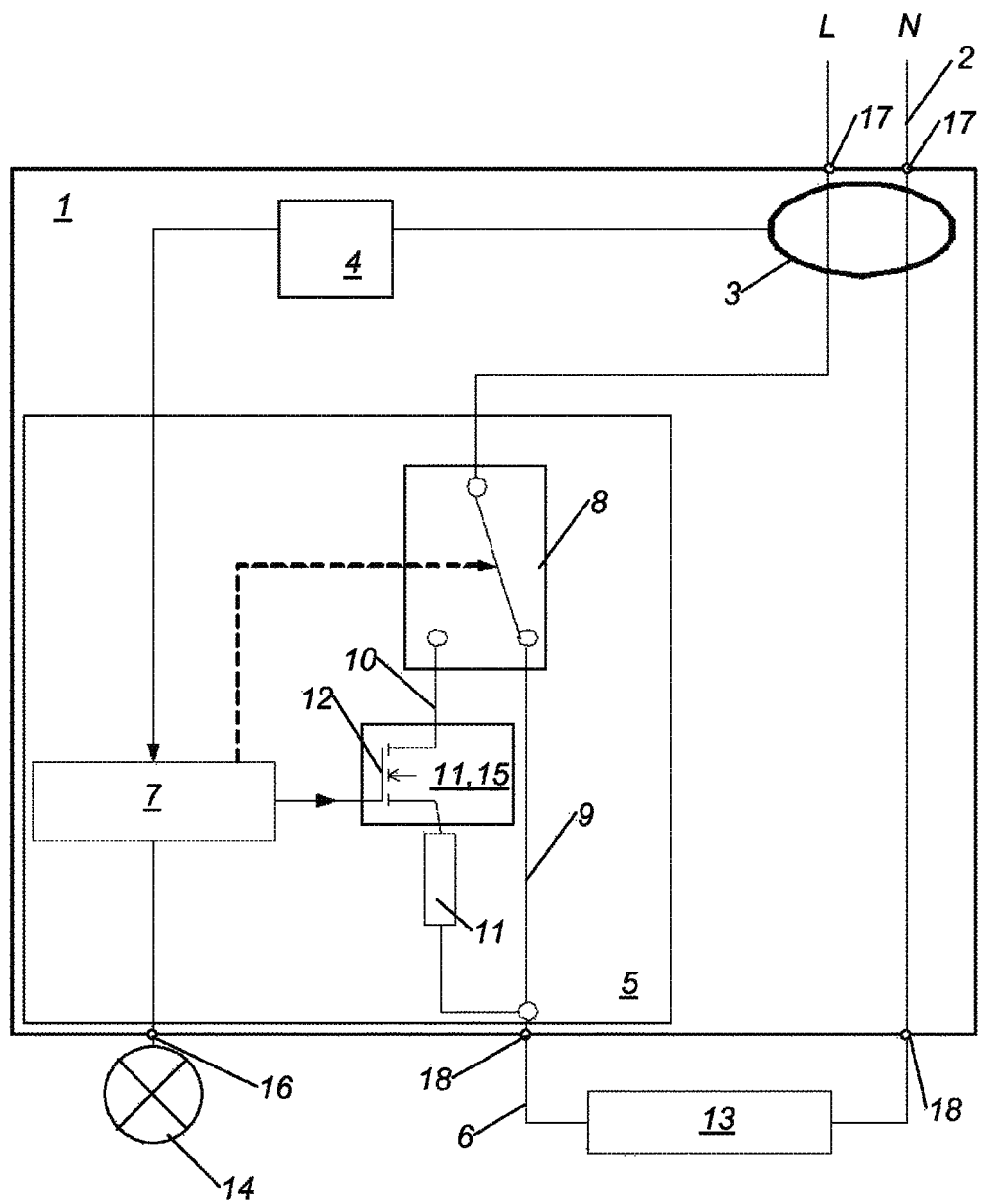

DEVICE TO REDUCE RESIDUAL CURRENT

CROSS-REFERENCE TO RELATED APPLICATIONS

This application is a U.S. national stage application under 35 U.S.C. § 371 of International Application No. PCT/EP2015/066273, filed on Jul. 16, 2015, and claims benefit to German Patent Application No. DE 10 2014 109 952.4, filed on Jul. 16, 2014. The International Application was published in German on Jan. 21, 2016, as WO 2016/008978 A1 under PCT Article 21(2).

FIELD

The invention relates to a device to reduce residual current in an electric circuit using a residual current sensor and an ampere meter.

BACKGROUND

It is a known procedure, and prescribed by law in most countries, to monitor electric circuits for the occurrence of so-called residual currents or ground residual currents. If such a residual current is ascertained which has exceeded a given value, the electric circuit in question is switched off by a residual-current circuit breaker. The specific value at which an electric circuit is switched off is, for example, a mere 30 mA, the limit for ventricular fibrillation in humans.

A drawback here is that, aside from the actual source of the fault, all of the other pieces of electrical equipment are also switched off. In the currently usual situation, it is not possible to continue to operate an electrical system with such a low-resistance ground connection. The residual-current circuit breaker in question is immediately switched off as soon as an attempt is made to once again start up the affected electric circuit or the affected electrical system. The system can only be restarted once the fault has been remedied.

SUMMARY

An aspect of the invention provides a device for reducing residual current in an electric circuit, the device comprising: a residual current sensor; an ampere meter; and a voltage-reduction unit. An output of the residual current sensor is connected to an input of the ampere meter. The voltage-reduction unit is connected to an output of the ampere meter. The voltage-reduction unit is configured to reduce an electric voltage that is present downstream from the device as a function of a magnitude of measured residual current so as to limit the measured residual current to a predefinable value.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following: the sole FIGURE shows a device according to the invention.

DETAILED DESCRIPTION

It is an aspect of the invention to provide a device with which the above-noted disadvantages can be avoided, and with which a restricted operation of the electrical equipment can be maintained when a residual current occurs and its cause persists.

Accordingly, when a residual current occurs and its cause persists, restricted operation of the electrical equipment can be maintained if the fault that has caused the ground connection is not of an excessively low resistance. In this manner, for instance, a computer system or a simple light fixture can still be operated. As a result, electrical equipment with a low power consumption and a switched-mode power supply can be used practically without restrictions since the supply voltage that is present in such a switched-mode power supply can be varied over a wide range. This means that, for example, one can continue to work at a computer until an electrician arrives. Consequently, a network access point, for instance, can continue to operate.

The invention also provides a method to reduce residual current in an electric circuit.

The invention provides a method with which the drawbacks noted above can be avoided and restricted operation of the electrical equipment can be maintained when a residual current occurs and its cause persists.

As a result, it is possible to achieve the advantageous effects that have been set forth above with a device according to aspects of the invention.

Aspects of the invention will be described in greater detail below, making reference to the accompanying drawing in which only one preferred embodiment is presented by way of example. In this context, the single FIGURE shows a block diagram or a stylized depiction of an embodiment of a device according to the invention to reduce residual current in an electric circuit.

The FIGURE shows a device 1 to reduce residual current in an electric circuit 2, especially in an electric low-voltage line, whereby the device 1 has a residual current sensor 3 and an ampere meter 4, whereby an output of the residual current sensor 3 is connected to an input of the ampere meter 4, whereby the device 1 has a voltage-reduction unit 5 which is connected to an output of the ampere meter 4, and whereby the voltage-reduction unit 5 is configured to reduce the electric voltage that is present downstream from the device 1 as a function of the magnitude of the measured residual current in order to limit the measured residual current to a specifiable value, especially 30 mA.

As a result, when a residual current occurs and its cause persists, restricted operation of the electrical equipment 13 can be maintained if the fault that has caused the ground connection is not of an excessively low resistance. In this manner, for instance, a computer system or a simple light fixture can still be operated. As a result, electrical equipment 13 with a low power consumption and a switched-mode power supply can be used practically without restrictions since the supply voltage that is present in such a switched-mode power supply can be varied over a wide range. This means that, for example, one can continue to work at a computer until an electrician arrives. Consequently, a network access point, for instance, can continue to operate.

The device 1 according to the invention is intended for use in the area of a low-voltage network, especially in the area of an end consumer of electric energy. The term low voltage here encompasses especially voltages within the range of a maximum of 400 V alternating voltage or 600 V direct voltage. Preferably, it is provided that a device 1 according to the invention is only arranged in a single electric circuit of a larger electrical installation environment. Preferably, the device 1 according to the invention is not employed in the area of high-voltage or medium-voltage technology or in the area of municipal, regional or trans-regional energy-distribution systems.

The device according to the invention is such that, whenever a so-called residual current or ground residual current occurs, it serves to reduce the electric voltage at the site of the fault to such an extent that there is no hazard for humans or systems and also so that a residual-current circuit breaker is not tripped. The usual limit values for residual currents are 30 mA in the realm of personal protection and 300 mA in the realm of fire protection and system protection, in each case in 240 V networks. However, different limit values can also be stipulated in this context.

The device 1 is intended for installation in the area of a distribution cabinet of an electrical system and it accordingly has at least two inputs 17 for connection to at least one neutral conductor N and to a phase L, and it also has a number of outputs 18 corresponding to the number of inputs 17. It is provided for the device 1 in question to be integrated into an electrical environment in such a way that any conceivable faults are only to be expected at the output 18 of the device 1 because all of the electrical consumers or pieces of equipment 13 are connected downstream from the device 1.

The device 1 to reduce residual current in an electric circuit 2 or partial circuit has a residual current sensor 3 and an ampere meter 4. The residual current sensor 3 here can be configured in a known manner as a summation current transformer, whereby the supply lines N, L form primary conductors, and moreover, a secondary winding is provided. Such summation current transformers are known in the field of residual current circuit breakers. It can also be provided for the residual current sensor 3 to be configured differently, for instance, comprising Förster probes, Hall sensors or shunt resistors.

An ampere meter is connected to an output of the residual current sensor 3. In this context, it can also be provided for at least parts of the residual current sensor 3 and of the ampere meter 4 to be configured in one piece.

The device 1 has a voltage-reduction unit 5 to reduce or lower an electric voltage in the electric circuit 2 in a predefinable manner. Consequently, the voltage present at the outputs 18 of the device 1 is reduced in comparison to the voltage present at the inputs 17 of the device 1.

The voltage-reduction unit 5 is connected to an output of the ampere meter 4 and it is configured to reduce the electric voltage that is present downstream from the device 1 as a function of the magnitude of the measured residual current in order to limit the measured residual current to a specifiable value or to reduce it accordingly.

In this context, it can be provided for the device 1 to continuously measure an occurring residual current and to intervene accordingly in the electric circuit 2 so as to regulate it. However, it can also be provided for the device not to be operated during normal operation of the electrical system and for it to only be or have to be started up by a user after the circuit 2 has been switched off by a residual current circuit breaker.

The voltage-reduction unit 5 is connected in series in a line 6 of the electric circuit 2, thus establishing a connection between one of the inputs 17 and one of the output 18 of the device 1.

In accordance with the described preferred embodiment, the voltage-reduction unit 5 has a control and/or regulation unit 7, whereby an output of the ampere meter 4 is connected to an input of the control and/or regulation unit 7, as a result of which any residual current that might actually occur is available as a controlled variable.

In accordance with the embodiment according to the invention, the voltage-reduction unit 5 has a switchover unit 8 for switching over between a normal operation branch 9 and a reduction branch 10. The normal operation branch 9 is preferably a plated-through hole between one of the inputs 17 and the corresponding output 18. The switchover unit 8 can be configured electromechanically as well as by means of semiconductor elements.

Preferably, there is at least one resistor 11 in the reduction branch 10, whereby preferably an ohmic resistor is provided. On the basis of the embodiment according to the invention described by way of an example, it is provided that the resistor 11 comprises a regulatable resistor 15 or that it is configured as a regulatable resistor 15, and that the regulatable resistor 15 is connected to the control and/or regulation unit 7. This allows a direct influence to be exerted on the voltage drop within the electric circuit 2. In this context, a switchable resistor cascade can also be seen as a regulatable resistor 15.

Preferably, the regulatable resistor 15 has at least one transistor 12 that is connected the control and/or regulation unit 7.

The device also has at least one signal output 16 and/or one signal means 14 which are actively switched once the device 1 reduces the voltage at its outputs 18.

In this context, for purposes of reducing the residual current in an electric circuit 2, it is preferably provided for an occurring residual current to be picked up by a residual current sensor 3 and subsequently measured by an ampere meter 4. A resistor 11 in the electric circuit 2 is switched by means of the switchover unit 8. This is done either manually or automatically, once the control and/or regulation unit 7 detects that the momentarily occurring residual current has exceeded a predefinable switchover value. This switchover value can be identical to the predefinable value or to the limit value of a residual current. Preferably, however, the switchover value is smaller than the limit value, for example, it amounts to 80% of the limit value, so that the appertaining switchover already takes place when the occurring residual current has reached a value of 80% of the limit value.

Subsequently, the control and/or regulation unit 7 regulates the resistance value of the resistor 11 or of the regulatable resistor 15 as a function of the magnitude of the measured residual current in order to limit the measured residual current to a predefinable value, especially to 30 mA. This causes a reduction in the voltage present at the outputs 18 of the device 1. In this context, it can be provided that this voltage is only reduced to a predefined value and, if the voltage falls below this value, a circuit breaker of the device 1 is tripped and consequently the entire network 2 is switched off.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A device for reducing residual current in an electric circuit, the device comprising:
   a residual current sensor;
   an ampere meter; and
   a voltage-reduction unit,
   wherein an output of the residual current sensor is connected to an input of the ampere meter,
   wherein the voltage-reduction unit is connected to an output of the ampere meter,
   wherein the voltage-reduction unit is configured to reduce an electric voltage that is present downstream from the device as a function of a magnitude of measured residual current so as to limit the measured residual current to a predefinable value, and
   wherein the voltage-reduction unit includes a switchover unit configured to switch over between a normal operation branch and a reduction branch.

2. The device of claim 1, wherein the voltage-reduction unit is connected in series in a line of the electric circuit.

3. The device of claim 1, wherein the voltage-reduction unit includes a control and/or regulation unit, and
   wherein the output of the ampere meter is connected to an input of the control and/or regulation unit.

4. The device of claim 1, further comprising:
   a resistor in the reduction branch.

5. The device of claim 4, wherein the resistor includes a regulatable resistor, and
   wherein the regulatable resistor is connected to the control and/or regulation unit.

6. The device of claim 5, wherein the regulatable resistor includes a transistor, connected to the control and/or regulation unit.

7. A method of reducing residual current in an electric circuit, the method comprising:
   picking up an occurring residual current using a residual current sensor;
   measuring the occurring residual current using an ampere meter;
   switching a resistor in the electric circuit using a voltage-reduction unit if the measured residual current has exceeded a predefinable switchover value; and
   regulating, using a control and/or regulation unit, a resistance value of the resistor as a function of a magnitude of the measured residual current in order to limit the measured residual current to a predefinable value,
   wherein the voltage-reduction unit comprises a switchover unit, and
   wherein the switchover unit is configured to switch over between a normal operation branch and a reduction branch.

8. The device of claim 1, wherein the predefinable value is 30 mA.

9. The device of claim 1, configured to reduce residual current in electric low-voltage line.

* * * * *